Patented Nov. 10, 1953

2,658,850

UNITED STATES PATENT OFFICE 2,658,850

4-OCTYL- AND NONYL-PYRIDINES FOR CONTROLLING FUNGOUS ATTACKS IN ORGANIC MATERIALS

Francis E. Cislak, Indianapolis, Ind., assignor to Reilly Tar and Chemical Corporation, Indianapolis, Ind., a corporation of Indiana.

No Drawing. Application February 8, 1950,
Serial No. 143,155

12 Claims. (Cl. 167—33)

This invention relates generally to a method and to compositions of matter for preventing or controlling the ravages of fungi.

This application is a continuation in part of my copending applications, Serial No. 737,721, filed March 27, 1947, and Serial No. 737,722 filed March 27, 1947, both now abandoned.

I have discovered that 4-alkylpyridines in which the alkyl group has at least eight carbon atoms and not more than nine carbon atoms are surprisingly effective fungicides. This astonishing discovery of the fungicidal properties of 4-octyl- and 4-nonylpyridines is entirely contrary to what might be expected. The prior art teaches that neither pyridine, 2-picoline, 3-picoline, nor 2,6-lutidine are fungicidal. My researches confirm the statements in the prior art; I too found that neither pyridine, nor the picolines, nor the lutidines possess any fungicidal properties. However, I have discovered that the 4-octylpyridines and the 4-nonylpyridines are really effective fungicides.

In my researches I have used the agar plate method for the evaluation of fungicidal properties. In this method, the compound under investigation is dispersed in nutrient agar and the agar is inoculated with a fungus. The highest dilution that prevents the growth of the fungus is called the fungicidal power of the compound. In most of my studies, I used as the test fungus, a wood-destroying fungus Madison #517 obtained from the Forest Products Laboratories, at Madison, Wisconsin. I have also used other fungi, including Chaetonium globosum and Trichophyton gypseum.

Below I list five 4-alkylpyridines, together with the highest dilutions in which they effectively inhibit the growth of Madison #517; these alkylpyridines all have either eight or nine carbon atoms.

4-(2-methylheptyl) pyridine, 1:25,000
4-n-octylpyridine, 1:50,000
4-n-nonylpyridine, 1:50,000
4-(5-nonyl) pyridine, 1:20,000
4-(2-methyloctyl) pyridine, 1:50,000

The remarkable and entirely unexpected discovery I made is that the high fungicidal properties are restricted to the 4-octylpyridines and to the 4-nonylpyridines. Thus, for example, 4-n-decylpyridine which has ten carbon atoms in the alkyl group was not effective in controlling the growth of Madison #517, even in a dilution of 1:1,000. Similarly, 4-alkylpyridines having less than eight carbon atoms in the alkyl group do not have high fungicidal properties. Thus, the highest effective dilution of 4-n-heptylpyridine was 1:16,000; for 4-n-hexylpyridine, the highest effective dilution was 1:10,000; the highest effective dilution for 4-n-amylpyridine was also 1:10,000; the highest effective dilution for 4-n-propylpyridine was 1:3,000.

The other surprising discovery I have made is that the alkyl group must be in the 4-position of the pyridine ring if the alkylpyridine is to possess any pronounced fungicidal properties. For example, while 4-n-propylpyridine was effective in dilutions of 1:3,000, the highest dilution at which the 2-n-propylpyridine was effective was 1:300; while the highest effective dilution for 4-(5-nonyl) pyridine was 1:20,000; 2-(5-nonyl) pyridine was not effective at a concentration as high as 1:100.

The 4-octylpyridines and the 4-nonylpyridines are useful in combating various kinds of fungus attacks. Thus, they may be used in: the preservation of wood against decay, the protection of fabrics against mildew, the prevention of sap staining of lumber, the preservation of leather from mold attack, the protection of living plants against fungous diseases, the disinfection of seeds, and the like.

As ordinarily used in combating fungous attacks, the 4-alkylpyridines are admixed with a carrier. Suitable carriers are finely divided solids, such as talc, bentonite, and the like; or the carriers may be solvents for the 4-alkylpyridines, such as alcohols, ketones, hydrocarbons, etc.; or the 4-alkylpyridines may be dispersed in the form of emulsions. As examples of the type of compositions which I have found useful for combating fungous attacks, I cite the following:

Example 1

Five pounds of 4-n-nonylpyridine is dissolved in 15 to 20 gallons of a petroleum naphtha, preferably a grade called Stoddard solvent or VMP naphtha. The resulting solution is an effective wood preservation agent for such items as window sash and doors.

Example 2

To one gallon of turpentine is added eight ounces of 4-(2-methyloctyl) pyridine. The resulting solution is useful in the mildew proofing of fabrics. The fabric to be treated is dipped into the solution and permitted to absorb the solution until the fabric has gained about 50% in weight. Then the fabric is allowed to dry in the air.

Example 3

Five grams of 4-n-octylpyridine is absorbed on 95 grams of finely divided (300 mesh) talc or bentonite. This is done by adding the 4-n-octylpyridine to the talc, and then thoroughly mixing in a ball mill.

The powder thus obtained is particularly useful in the treatment of seeds, such as tomato seeds, to prevent the tender shoots from being attacked by the fungi infesting the soil.

Example 4

A preparation for the mildew proofing of leather goods is prepared by dissolving 200 grams of paraffin wax in 700 grams of petroleum naphtha (Stoddard solvent) and then adding 100 grams of 4-n-nonylpyridine.

In addition to discovering that the 4-octyl- and 4-nonylpyridines are effective fungicides, I have also found that these alkylpyridines react with certain metallic salts to form new compounds which possess the unusual fungicidal properties of the alkylpyridines. Thus, for example, I have found that when I mix twenty grams of 4-n-nonylpyridine with twenty grams of copper propionate and then warm the mixture, I obtain a new compound of 4-n-nonylpyridine copper propionate. This new compound comprising 4-n-nonylpyridine is crystalline, has a blue-green color, and after recrystallization from alcohol, melts at about 85° C. It is insoluble in water but is soluble in most organic solvents, such as hydrocarbons, alcohols, ketones, and the like. This salt was found to inhibit the growth of Madison #517 in dilutions as high as 1:20,000. I have made similarly effective fungicides, comprising 4-octylpyridines and 4-nonylpyridines by reacting the 4-octylpyridines and 4-nonylpyridines with zinc chloride, mercury chloride, cobalt chloride, nickel chloride, silver nitrate, etc.

It is to be understood that the above examples are given by way of illustration only. Many modifications will readily suggest themselves to those skilled in the art.

I claim as my invention:

1. The method of combating fungous attacks in organic materials which comprises treating the organic materials with a fungicidal composition comprising a 4-alkylpyridine, the alkyl group of which has at least eight carbon atoms but not more than nine carbon atoms.
2. The method of claim 1 in which the alkylpyridine is a 4-octylpyridine.
3. The method of claim 1 in which the alkylpyridine is a 4-nonylpyridine.
4. The method of claim 1 in which the alkylpyridine is 4-n-nonylpyridine.
5. The method of claim 1 in which the alkylpyridine is 4-n-octylpyridine.
6. The method of claim 1 in which the alkylpyridine is 4-(2-methyloctyl) pyridine.
7. A fungicidal composition comprising an organic solvent and a 4-alkylpyridine, the alkyl group of which has at least eight carbon atoms but not more than nine carbon atoms.
8. The fungicidal composition of claim 7 in which the alkylpyridine is a 4-octylpyridine.
9. The fungicidal composition of claim 7 in which the alkylpyridine is a 4-nonylpyridine.
10. The fungicidal composition of claim 7 in which the alkyl pyridine is 4-n-nonylpyridine.
11. The fungicidal composition of claim 7 in which the alkylpyridine is 4-n-octylpyridine.
12. The fungicidal composition of claim 7 in which the alkylpyridine is 4-(2-methyloctyl) pyridine.

FRANCIS E. CISLAK.

References Cited in the file of this patent

UNITED STATES PATENTS

| Number | Name | Date |
| --- | --- | --- |
| 2,564,249 | Cislak | Aug. 14, 1951 |

OTHER REFERENCES

King et al., Journal Economic Entomology, volume 37, pages 629 to 640 (1944).